United States Patent
Park

(10) Patent No.: US 9,467,614 B2
(45) Date of Patent: Oct. 11, 2016

(54) CAMERA MODULE AND METHOD FOR DRIVING THE SAME TO ACHIEVE FAST FOCUS OF IMAGE BEING CAPTURED

(75) Inventor: Jongha Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 11 days.

(21) Appl. No.: 14/118,506

(22) PCT Filed: May 18, 2012

(86) PCT No.: PCT/KR2012/003963
§ 371 (c)(1),
(2), (4) Date: Nov. 18, 2013

(87) PCT Pub. No.: WO2012/157995
PCT Pub. Date: Nov. 22, 2012

(65) Prior Publication Data
US 2014/0085530 A1    Mar. 27, 2014

(30) Foreign Application Priority Data
May 18, 2011 (KR) .................. 10-2011-0046967

(51) Int. Cl.
*H04N 5/232* (2006.01)
*G03B 13/36* (2006.01)

(52) U.S. Cl.
CPC .......... *H04N 5/23212* (2013.01); *G03B 13/36* (2013.01)

(58) Field of Classification Search
None
See application file for complete search history.

(56) References Cited

U.S. PATENT DOCUMENTS

| | | | |
|---|---|---|---|
| 2007/0216796 A1* | 9/2007 | Lenel et al. | 348/345 |
| 2008/0073526 A1* | 3/2008 | Takane et al. | 250/307 |
| 2009/0153681 A1 | 6/2009 | Yang et al. | |
| 2009/0310885 A1* | 12/2009 | Tamaru | 382/275 |
| 2011/0125017 A1* | 5/2011 | Ramamurthy et al. | 600/443 |
| 2011/0175993 A1* | 7/2011 | Uemori et al. | 348/79 |

FOREIGN PATENT DOCUMENTS

| | | |
|---|---|---|
| JP | 6-6659 A | 1/1994 |
| JP | 2007-178480 A | 7/2007 |
| KR | 10-2009-0063611 A | 6/2009 |

* cited by examiner

*Primary Examiner* — Shahbaz Nazrul
(74) *Attorney, Agent, or Firm* — Birch, Stewart, Kolasch & Birch, LLP

(57) ABSTRACT

The present invention proposes a camera module and a method for driving the same, the camera module including an image pick-up unit including a lens to photograph an object, a lens transfer unit configured to move the lens of the image pick-up unit, a focusing driving unit configured to operate the lens transfer unit, and an ISP (Image Signal Processor) configured to select, as an auto-focused image, an image of the object by dividing an image area of the object photographed by the image pick-up unit to a plurality of sections, controlling the focusing driving unit to allow each section to be auto-focused and photographed, detecting and comparing a focusing level of same pixel from each image of the object photographed from each auto-focused section.

7 Claims, 4 Drawing Sheets

CAMERA MODULE AND METHOD FOR DRIVING THE SAME TO ACHIEVE FAST FOCUS OF IMAGE BEING CAPTURED

TECHNICAL FIELD

The teachings in accordance with exemplary embodiments of this invention relate generally to a camera module and a method for driving the camera module.

BACKGROUND ART

Concomitant with wide propagation of various mobile terminals and commercialization of wireless Internet services, demands by consumers related to the mobile terminals are diversified, and various types of additional equipment are attached to the mobile terminals. Among the various types of additional equipment, a camera module may be a representative device capable of editing and transmitting a still image or a moving picture, as necessary, by photographing the still image or the moving picture, and storing the still image or the moving picture in image data.

Meantime, a camera is changed in focus of a lens in response to a distance between the lens and an object. Therefore, a camera requires a function, i.e., an AF (Auto Focus) function capable of automatically adjusting a focus in response to a distance between a lens and an object in order to enable a photographing of an excellent quality.

DISCLOSURE

Technical Problem

Accordingly, the present invention is provided to solve the above disadvantages/problems occurring in the prior art, and the present invention provides a camera module configured to obtain a sharp image, to prevent a blurred image from being selected by circles of confusion and overlapping of the circles of confusion and to improve accuracy capable of extracting a best-focus image.

Technical Solution

In one general aspect of the present invention, there is provided a camera module, the camera module comprising:
an image pick-up unit including a lens to photograph an object;
a lens transfer unit configured to move the lens of the image pick-up unit;
a focusing driving unit configured to operate the lens transfer unit; and
an ISP (Image Signal Processor) configured to select, as an auto-focused image, an image of the object by dividing an image area of the object photographed by the image pick-up unit to a plurality of sections, controlling the focusing driving unit to allow each section to be auto-focused and photographed, detecting and comparing a focusing level of same pixel from each image of the object photographed from each auto-focused section.

In some exemplary embodiments, the ISP may select, as an auto-focused image, an image of the object having a highest pixel in a focusing level.

In some exemplary embodiments, the same pixel may include a plurality of pixels, and the ISP may calculate an average level of the focusing levels detected from each of the images of the object, and select, as auto-focused images, images of pixel having highest pixels in calculated average values.

In some exemplary embodiments, the focusing level may be a sharpness value or an edge value of the image of the object.

In another general aspect of the present invention, there is provided a camera module, the camera module comprising:
an image pick-up unit including a lens to photograph an object;
a lens transfer unit configured to move the lens of the image pick-up unit;
a focusing driving unit configured to operate the lens transfer unit; and
an ISP (Image Signal Processor) configured to obtain a sharp image of the object by detecting and comparing focusing levels of all same pixels of images of the object photographed by dividing an image area of the object to a plurality of sections, and by extracting and combining highest pixels in focusing levels.

In still another general aspect of the present invention, there is provided a method for driving a camera module, the method comprising:
dividing an image area of an object photographed by an image pick-up unit to a plurality of sections, and photographing each section by auto-focusing;
detecting focusing levels of same pixels from images of the object in each auto-focused and photographed section; and
selecting, as an auto-focused image, an image of pixel having a highest pixel level among the same pixels by comparing detected focusing levels.

In some exemplary embodiments, the step of selecting, as an auto-focused image, an image of pixel having a highest pixel level among the same pixels by comparing detected focusing levels may include selecting, as an auto-focused image, an image of pixel having a highest pixel in focusing level.

In some exemplary embodiments, the step of detecting focusing levels of same pixels from images of the object in each auto-focused and photographed section may further include detecting focusing levels of adjacent pixels of same pixel, and the step of selecting, as an auto-focused image, an image of pixel having a highest pixel level among the same pixels by comparing detected focusing levels includes calculating a deviation between the detected focusing level of same pixels and the focusing level of adjacent pixels, and selecting, as an auto-focused image, an image of a pixel having a highest calculated deviation.

Advantageous Effects

The present invention has an advantageous effect of obtaining a sharp image by receiving, by an ISP, images of an object in each section auto-focused and photographed by an image pick-up unit, by detecting and comparing focusing levels of same pixel of images of the object, and by selecting, as an auto-focused image, an image of an object having a highest pixel in focusing level.

Another advantageous effect is that a DOF (Depth of Field) intrinsically generated by a lens is minimized to minimize an image partially blurred during a macro photographing.

Still another advantageous effect is that selection of a blurred image caused by circles of confusion and overlapped circles of confusion can be prevented to improve accuracy configured to extract a best-focus image.

BEST MODE

Hereinafter, exemplary embodiments of the present invention will be described in detail with reference to the accompanying drawings.

Figure 1:
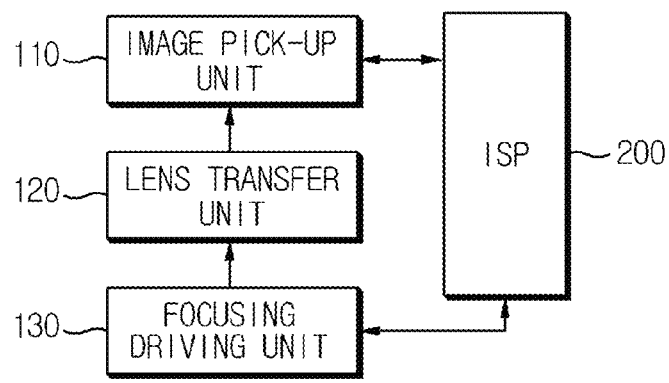
FIG. 1 is a schematic block diagram illustrating a camera module according to a first exemplary embodiment of the present invention.

FIG. 1 is a schematic block diagram illustrating a camera module according to a first exemplary embodiment of the present invention.

A camera module according to the first exemplary embodiment of the present invention includes an image pick-up unit (110) including a lens to photograph an object, a lens transfer unit (120) configured to move the lens of the image pick-up unit (110), a focusing driving unit (130) configured to operate the lens transfer unit (120), and an ISP (Image Signal Processor, 200) configured to select, as an auto-focused image, an image of the object by dividing an image area of the object photographed by the image pick-up unit to a plurality of sections, controlling the focusing driving unit (130) to allow each section to be auto-focused and photographed, detecting and comparing a focusing level of same pixel from each image of the object photographed from each auto-focused section.

At this time, the ISP (200) controls the image pick-up unit (110) and the focusing driving unit (130). Furthermore, the focusing level is a degree in which a focus is well adjusted, and may be defined by a sharpness value or an edge value of an image of an object, for example.

Thus, the camera module according to the first exemplary embodiment of the present invention is configured to control the focusing driving unit (130) in such a manner that an image area of an object photographed by the image pick-up unit (110) is divided into a plurality of sections by the ISP (200), and each of the section is auto-focused. Furthermore, the ISP (200) receives the auto-focused and photographed images of the object in each section to detect and compare focusing levels of same pixel in the images of the object, and selects, as an auto-focused image, an image of an object having a highest pixel in the focusing level, whereby a sharp image can be obtained.

In another configuration, the ISP (200) may detect and compare focusing levels of all same pixels of images of the auto-focused and photographed sectioned objects, and extract and combine the pixels highest in focusing levels, whereby a sharp image of an object can be obtained. Thus, the present invention has an advantageous effect is that a DOF (Depth of Field) intrinsically generated by a lens can be minimized to minimize an image partially blurred during a macro photographing.

Figure 2:
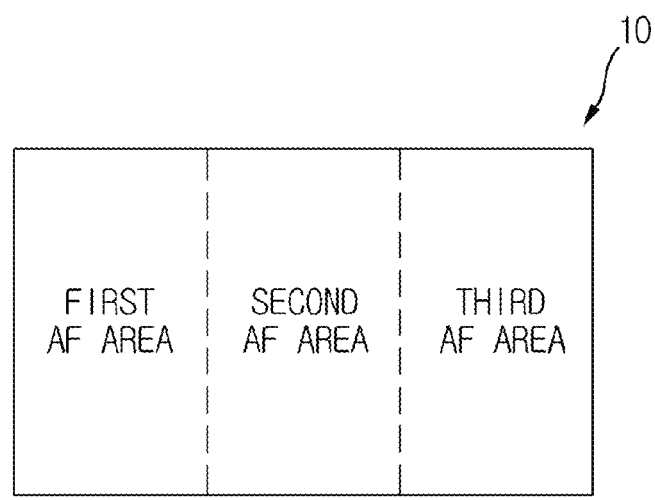
FIG. 2 is a schematic view illustrating an AF area of an image of an object according to a first exemplary embodiment of the present invention.
Figure 3:
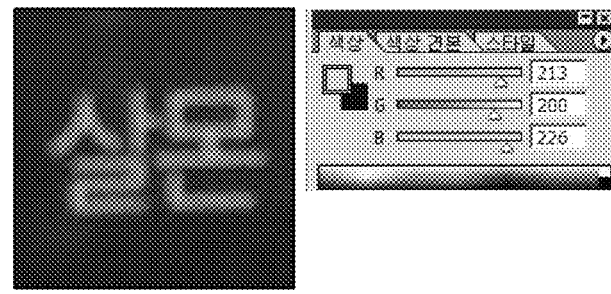
FIGS. 3 and 4 are schematic views illustrating a method for selecting an auto-focused image in a camera module according to a first exemplary embodiment of the present invention.
Figure 4:
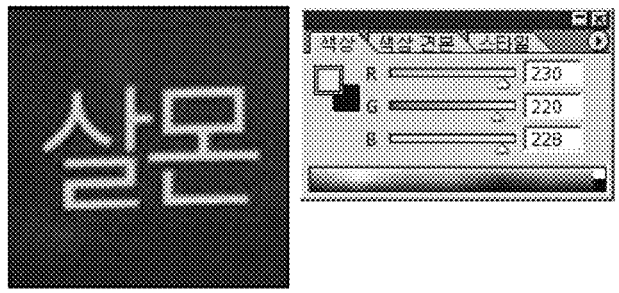

FIG. 2 is a schematic view illustrating an AF area of an image of an object according to a first exemplary embodiment of the present invention, and FIGS. 3 and 4 are schematic views illustrating a method for selecting an auto-focused image in a camera module according to a first exemplary embodiment of the present invention.

Referring to FIG. 2, the ISP (200) divides an image area (10) of an object photographed by the image pick-up unit to a plurality of sections (e.g., three sections in FIG. 2). Furthermore, each section is auto-focused and photographed. That is, a first AF (Auto Focus) area is auto-focused and photographed, and a second AF area is auto-focused and photographed, and then, a third AF area is auto-focused and photographed.

After photographing of three sheets of the object, in order to determine a best-focused image from each section from the three sheets of images, focusing levels of same pixel in the three sheets are detected and compared.

Referring to FIGS. 3 and 4, if the same pixel is a letter area photographed of a letter of 살몬, RGB data of the 살몬 letter area is (213/200/226) as in FIG. 3, and (230/220/228) as in FIG. 4, where it can be confirmed that an image in FIG. 4 has a relatively higher RGB data value than that in FIG. 3, where the ISP selects the image of FIG. 4 as a best auto-focused image.

Hence, the ISP can select, as an auto-focused image, an image of an object having the highest pixel in focusing level by dividing an image area of the object photographed by the image pick-up unit to a plurality of sections, controlling the focusing driving unit to allow each section to be auto-focused and photographed, detecting and comparing a focusing level of same pixel from each image of the object photographed from each auto-focused section.

Figure 5:
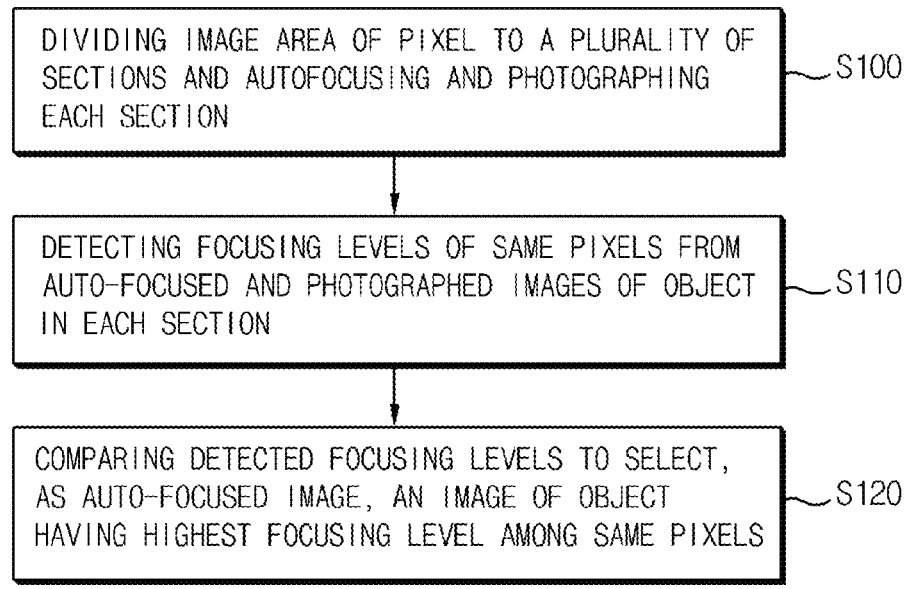
FIG. 5 is a flow chart illustrating a method for driving a camera module according to a first exemplary embodiment of the present invention.

FIG. 5 is a flow chart illustrating a method for driving a camera module according to a first exemplary embodiment of the present invention.

The method for driving a camera module according to the first exemplary embodiment of the present invention includes dividing an image area of an object photographed by an image pick-up unit to a plurality of sections, and photographing each section by auto-focusing (S100). Then, focusing levels of same pixels are detected from images of the object in each auto-focused and photographed section (S110). Thereafter, the detected auto-focused levels are compared to select, as an auto-focused image, an image of pixel having a highest pixel level among the same pixels (S120).

Mode for Invention

Figure 6:
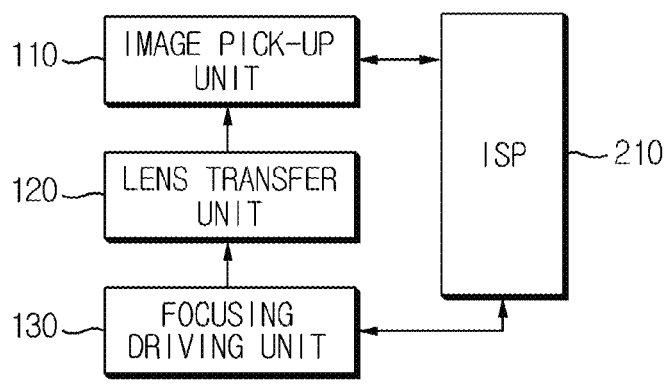
FIG. 6 is a schematic block diagram illustrating a camera module according to a second exemplary embodiment of the present invention.

FIG. 6 is a schematic block diagram illustrating a camera module according to a second exemplary embodiment of the present invention.

The camera module according to the second exemplary embodiment of the present invention includes an image pick-up unit (110) including a lens to photograph an object, a lens transfer unit (120) configured to move the lens of the image pick-up unit (110), a focusing driving unit (130) configured to operate the lens transfer unit (120), and an ISP (Image Signal Processor, 200) configured to control the focusing driving unit (130) by dividing an image area of an object photographed by an image pick-up unit (110) to a plurality of sections, and photographing each section by auto-focusing, and to select, as an auto-focused image, an image of pixel having highest pixels in calculated average value by detecting the average values of focusing level respectively detected from images of object and calculating an average value of focusing level detected from each image of the object.

Thus, the camera module according to the second exemplary embodiment of the present invention is configured such that the ISP (200) controls the focusing driving unit (130) to allow the image pick-up unit (110) to auto-focus and photograph the plurality of sections divided by the image area of the object. Furthermore, the camera module according to the second exemplary embodiment of the present invention has an advantageous effect of preventing selection of a blurred image caused by circles of confusion and overlapped circles of confusion and improving accuracy configured to extract a best-focus image, by detecting focusing levels of a plurality of same pixels of images of the object by allowing the ISP (200) to receive the images of object auto-focused and photographed from each section by the image pick-up unit (110), calculating an average value of focusing level detected from each image of object, and selecting, as an auto-focus image, an image of pixel having the highest pixels in the calculated average values.

For information, if the focusing is not realized, a circle of confusion mixes with other adjacent circles of confusion to blur an image obtained by an original pixel, thereby reducing a difference of level values between a selected pixel and surrounding pixels, whereby a focus can be determined as being relatively accurate as the level difference from the surrounding pixels turns into severity.

Figure 7:
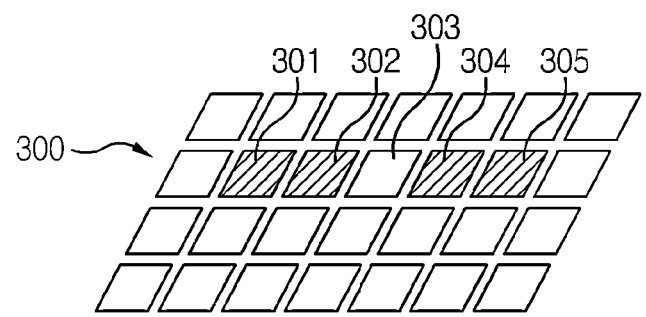
FIGS. 7 to 9 are schematic views illustrating a method for selecting an auto-focused image in a camera module according to a second exemplary embodiment of the present invention.
Figure 8:
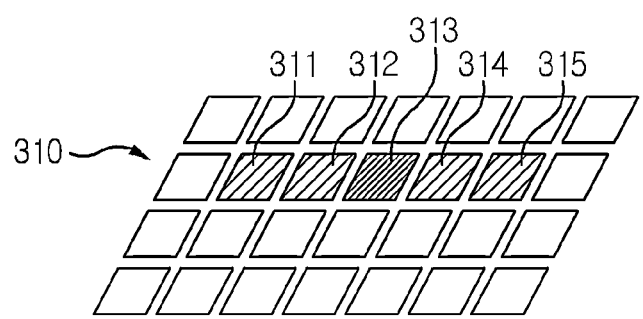
Figure 9:
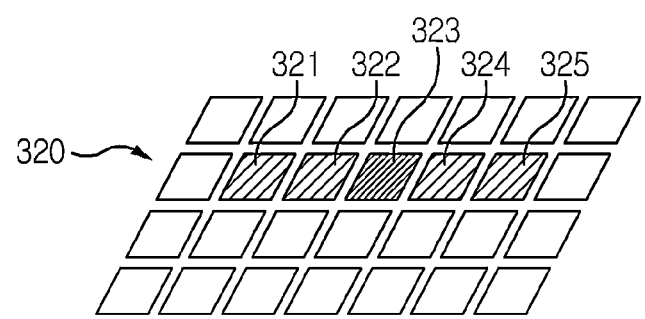

FIGS. 7 to 9 are schematic views illustrating a method for selecting an auto-focused image in a camera module according to a second exemplary embodiment of the present invention.

The camera module according to the second exemplary embodiment of the present invention is configured such that an image area of an object photographed by the image pick-up unit is divided into a plurality of sections by the ISP, and each of the section is auto-focused and photographed.

Hereinafter, as in FIGS. 7 to 9, a method for selecting an auto-focused image will be described assuming that images (300, 310, 320) of three objects are photographed. At this time, the images (300, 310, 320) of three objects are formed with pixels having a same image area, because the images (300, 310, 320) of three objects are the ones photographed of the same object, albeit being different in auto-focused area.

Therefore, a plurality of pixels (301, 302, 303, 304, 305) of the image '300' of an object has a same image as a plurality of pixels (311, 312, 313, 314, 315) of the image '310' of an object and a plurality of pixels (321, 322, 323, 324, 325) of the image '320' of an image, where an average value of each focusing level of the plurality of pixels (301, 302, 303, 304, 305) of the image '300' of the object, an average value of each focusing level of the plurality of pixels (311, 312, 313, 314, 315) of the image '310' of the object, and an average value of each focusing level of the plurality of pixels (321, 322, 323, 324, 325) of the image '320' of the image are calculated, and an image of pixel having a pixel highest in the calculated average value is selected as an auto-focused image.

In another method, focusing levels of same pixels from images of the object auto-focused and photographed in each section and focusing levels of adjacent pixels of the same pixel are detected to calculate a deviation of focusing level between the detected focusing level of same pixel and focusing level of adjacent pixels, and an auto-focused image is selected as an image of pixel having pixels highest in calculated deviation.

For example, when each focusing level of the plurality of pixels (301, 302, 303, 304, 305) of the image '300' of the object is respectively (104, 95, 107, 91, 103), each focusing level of the plurality of pixels (311, 312, 313, 314, 315) of the image '310' of an object is respectively (119, 87, 111, 81, 113), and), each focusing level of the plurality of pixels (321, 322, 323, 324, 325) of the image '320' of the image is respectively (92, 108, 98, 103, 92), a deviation of focusing level of the plurality of pixels (301, 302, 303, 304, 305) of the image '300' of the object is 6.16, a deviation of the plurality of pixels (311, 312, 313, 314, 315) of the image '310' of an object is 15.19, and a deviation of the plurality of pixels (321, 322, 323, 324, 325) of the image '320' of the image is 6.24.

Figure 11:
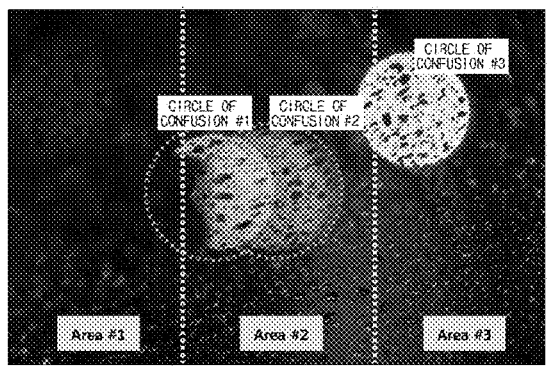
FIG. 11 is a photographic view illustrating an image of circle of confusion.

Thus, the calculated deviation is highest at the image '310' of the object, and therefore, the image of object '310' is selected as an auto-focused image. For reference, when an object grows nearer to or farther from a lens, an image of the object generates circles of confusion #1, #2 and #3 as illustrated in FIG. 11, which are circular blobs instead of sharp points. Furthermore, if the circles of confusion #1 and #2 are overlapped, an error may be generated in selection of a best-focused image using only a level value of the same area relative to the images of three sheets by interference of circles of confusion.

Figure 10:
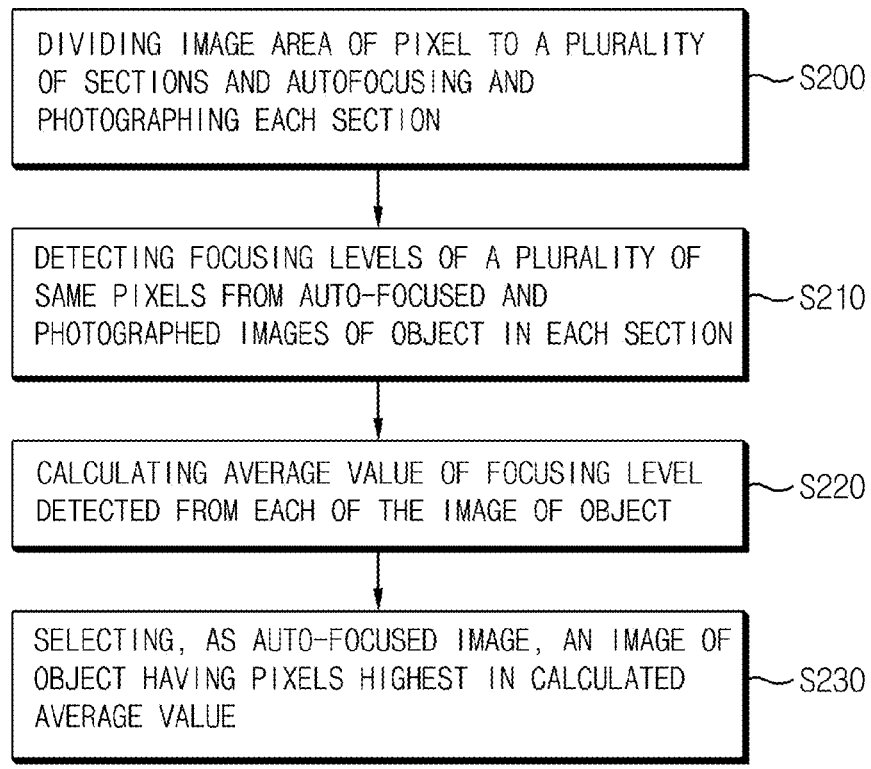
FIG. 10 is a flow chart illustrating a method for driving a camera module according to a second exemplary embodiment of the present invention.

FIG. 10 is a flow chart illustrating a method for driving a camera module according to a second exemplary embodiment of the present invention.

The method for driving a camera module according to the second exemplary embodiment of the present invention includes dividing an image area of an object photographed by an image pick-up unit (110) to a plurality of sections, and photographing each section by auto-focusing (S200), detecting focusing levels of a plurality of same pixels from images of the object from each auto-focused and photographed section (S210), calculating an average value of focusing levels detected from each image of the object (S220), and selecting, as an auto-focused image, the image of object having pixels highest in the calculated average value.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

Exemplary embodiments of the camera module according to the present invention have an industrial applicability of obtaining a sharp image by receiving, by an ISP, images of an object in each section auto-focused and photographed by an image pick-up unit, by detecting and comparing focusing levels of same pixel of images of the object, and by selecting, as an auto-focused image, an image of an object having a highest pixel in focusing level.

The invention claimed is:

1. A camera module, the camera module comprising:
an image pick-up unit including a lens to photograph an object;
a lens transfer shaft configured to move the lens of the image pick-up unit;
a focusing driving actuator configured to operate the lens transfer shaft; and
an ISP (Image Signal Processor) configured to select, as an auto-focused image, an image of the object by dividing an image area of the object photographed by the image pick-up unit to a plurality of sections, controlling the focusing driving actuator to allow each section to be auto-focused and photographed, detecting and comparing a focusing level of same pixel from each image of the object photographed from each auto-focused section,
wherein the same pixel includes a plurality of pixels, and the ISP calculates an average level of the focusing levels detected from each of the images of the object, and selects, as auto-focused images, images of pixel having highest pixels in calculated average values.

2. A camera module comprising:
an image pick-up unit including a lens to photograph an object;
a lens transfer shaft configured to move the lens of the image pick-up unit;
a focusing driving actuator configured to operate the lens transfer shaft; and
an ISP (Image Signal Processor) configured to select, as an auto-focused image, an image of the photographed object by dividing an image area of the object photographed by the image pick-up unit to a plurality of sections, controlling the focusing driving actuator to allow each section to be auto-focused and photographed, detecting and comparing a focusing level of same pixel from each image of the object photographed from each auto-focused section,
wherein the focusing level comprises a RGB data value, and
wherein the selected auto-focused image has a relatively higher RGB data value than the rest.

3. The camera module of claim 1, wherein the focusing level is a sharpness value or an edge value of the image of the object.

4. A camera module, the camera module comprising:
an image pick-up unit including a lens to photograph an object;
a lens transfer shaft configured to move the lens of the image pick-up unit;
a focusing driving actuator configured to operate the lens transfer shaft; and
an ISP (Image Signal Processor) configured to obtain a sharp image of the object by detecting and comparing an average of focusing levels of all same pixels of images of the object photographed by dividing an image area of the object to a plurality of sections, and by extracting and combining highest pixels in the average of focusing levels.

5. A method for driving a camera module, the method comprising:
dividing an image area of an object photographed by an image pick-up unit to a plurality of sections, and photographing each section by auto-focusing;
detecting focusing levels of same pixels from images of the object in each auto-focused and photographed section; and
selecting, as an auto-focused image, an image of pixel having a highest pixel level among the same pixels by comparing the focusing levels,
wherein the focusing level comprises a RGB data value, and
wherein the selected auto-focused image has a relatively higher RGB data value than the rest.

6. The method of claim 5, wherein the step of selecting, as an auto-focused image, an image of pixel having a highest pixel level among the same pixels by comparing calculated average of the focusing levels includes selecting, as an auto-focused image, an image of pixel having a highest pixel in calculated average value.

7. A method for driving a camera module, the method comprising:
dividing an image area of an object photographed by an image pick-up unit to a plurality of sections, and photographing each section by auto-focusing;
detecting focusing levels of same pixels from images of the object in each auto-focused and photographed section; and
selecting, as an auto-focused image, an image of pixel having a highest pixel level among the same pixels by comparing detected focusing levels,
wherein the step of detecting focusing levels of same pixels from images of the object in each auto-focused and photographed section further includes detecting focusing levels of adjacent pixels of same pixel, and the step of selecting, as an auto-focused image, an image of pixel having a highest pixel level among the same pixels by comparing detected focusing levels includes calculating a deviation between the detected focusing level of same pixels and the focusing level of adjacent pixels, and selecting, as an auto-focused image, an image of a pixel having a highest calculated deviation.

* * * * *